(12) United States Patent
Qiu

(10) Patent No.: US 11,847,085 B2
(45) Date of Patent: Dec. 19, 2023

(54) METHOD, SYSTEM, AND SERVER FOR MONITORING STATUS OF SOLID STATE DRIVE

(71) Applicant: Fulian Precision Electronics (Tianjin) Co., LTD., Tianjin (CN)

(72) Inventor: Duo Qiu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/864,568

(22) Filed: Jul. 14, 2022

(65) Prior Publication Data
US 2023/0315668 A1    Oct. 5, 2023

(30) Foreign Application Priority Data

Mar. 29, 2022    (CN) .......................... 202210322045.5

(51) Int. Cl.
*G06F 13/00*    (2006.01)
*G06F 13/40*    (2006.01)
*G06F 13/42*    (2006.01)

(52) U.S. Cl.
CPC ...... *G06F 13/4081* (2013.01); *G06F 13/4221* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 2003/0046461 A1* | 3/2003 | Sivertsen | G11B 33/12 |
| 2012/0137027 A1* | 5/2012 | Zheng | G06F 11/3068 710/19 |
| 2020/0233823 A1* | 7/2020 | Zhang | G06F 13/40 |
| 2020/0311013 A1* | 10/2020 | Hao | G06F 11/0772 |
| 2022/0224772 A1* | 7/2022 | Narayanan | H04W 76/30 |

FOREIGN PATENT DOCUMENTS

| | | |
|---|---|---|
| CN | 109032992 A | 12/2018 |
| CN | 109933475 A | 6/2019 |
| TW | 201944242 A | 11/2019 |

\* cited by examiner

*Primary Examiner* — Henry Tsai
*Assistant Examiner* — Dean Phan
(74) *Attorney, Agent, or Firm* — ScienBiziP, P.C.

(57) ABSTRACT

A method, a system, and a server for monitoring status of SSD applied in the server allows a volume management device which has been disabled because of conflict to be used to maintain unchanged information of power indicating control bit when an SSD is unplugged. The unchanged information of power indicating control bit is transmitted to a CPLD and decoder information is obtained from the CPLD. Position of the SSD in the register is set according to the decoder information.

14 Claims, 3 Drawing Sheets

METHOD, SYSTEM, AND SERVER FOR MONITORING STATUS OF SOLID STATE DRIVE

CROSS-REFERENCE TO RELATED APPLICATIONS

This application claims priority to Chinese Patent Application No. 202210322045.5 filed on Mar. 29, 2022, in China National Intellectual Property Administration, the contents of which are incorporated by reference herein.

FIELD

The subject matter herein generally relates to server technology, and particularly to a method, a system, and a server for monitoring status of solid state drive (SSD).

BACKGROUND

Servers or workstations need a number of SSDs for storing data, and faster data reading speed of the server or workstations. When the server or workstations use a number of hot-pluggable SSDs, a volume management device (VMD) is needed for monitoring and managing the SSDs. However, management by VMD needs to be improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
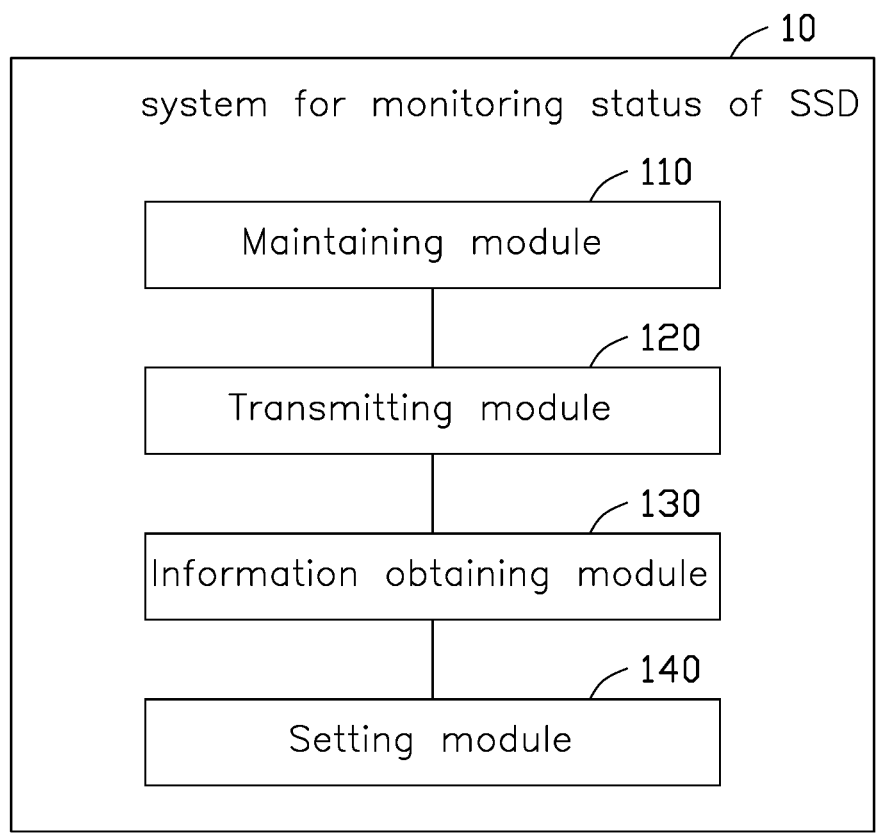
FIG. 1 is a schematic view of an embodiment of a system for monitoring status of SSD.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Servers or workstations need a number of solid state drives (SSDs) for storing data, to improve data reading access of the server or workstations. When the servers or workstations use a number of SSDs with hot plugging function, volume management device (VMD) is needed for monitoring and managing the SSDs.

At present, the SSD of the servers or the workstations uses peripheral component interconnect express (PCIe) and Central Processor Unit (CPU) for data transmission. A hot-pluggable function exists in the PCIe protocol, the VMD technology executes a monitoring and managing status of SSD based on the PCIe bus. However, there may be some conflict in some cases, so there is room for improving.

The present disclosure provides a method, a system, and a server for monitoring status of SSD, which may execute monitoring and managing status of SSD through software of PCIe, and a processor can disable a VMD in case of conflict.

FIG. 1 illustrates a schematic view of an embodiment of a system 10 for monitoring status of SSD. The system 10 at least includes a maintaining module 110, a transmitting module 120, an information obtaining module 130, and a setting module 140, all electrically connected.

VMD technology is used in a root port of an Intel Xeon extension processor. The VMD technology may accomplish operation and maintenance tasks without kernel interrupt service. In detail, by the VMD technology, insertion and removal as a PCIe bus event can be redirected to driving program of storage sensing based on the SSD of Non Volatile Memory Express (NVMe). The PCIe bus event of inserting and removing the SSD needs cooperative processes with Basic Input Output System (BIOS) and operating system.

For reliability, VMD technology may be disabled or forbidden in some cases. The PCIe presents a normal status with a LED normally on when the operator does not activate the VMD management, but the function of the LED remains, and that may cause the LED to run abnormally. The VMD can be activated or the LED disabled, but if the VMD is running abnormally, the LED is disabled, but the disabling of the LED may cause inability in determining a position of the SSD in the server, and when SSD functions abnormally, the inability in determining the position of the SSD in the server may affect a stability of the server.

In at least one embodiment, in addition to modules referenced in the figures, the system 10 may be connected to a CPU, a Baseboard Management Controller (BMC), and a Complex Programmable Logic Device (CPLD) on the SSD. The system 10 may further include a number of connectors applied in Inter-Integrated Circuit (I2C) corresponding to ports of PCIe of the CPU. The ports of PCIe of the CPU are connected to the SSD through the BMC connectors, to establish a communication link of the system 10 and the SSD for exchanging data between the BMC and the CPLD of the SSD.

In at least one embodiment, when the SSD is unplugged or disconnected, the maintaining module 110 maintains an unchanged information of power indicating control bit. In detail, the maintaining module 110 maintains the information of power indicating control bit as 01b through the PCIe software.

In at least one embodiment, the transmitting module 120 transmits the information of power indicating control bit to the CPLD through VPP I2C. In detail, the information as to power indicating control bit transmitted by the transmitting module 120 is 1b.

In at least one embodiment, the information obtaining module 130 obtains decoder information from the CPLD. In detail, the information obtaining module 130 may decode the VPP I2C through the CPLD, to obtain the decoder information from the CPLD.

In at least one embodiment, the setting module 140 sets position in register according to the decoder information. In detail, the setting module 140 sets the register position as 1, sets the VMD as disabled and switches off the LED indicating position through the PCIe software. The setting module 140 sets the VMD as disabled and switches off the positioning LED, which prevents a system conflict of the NVMe and the CPIe after the VMD is switched off, and improves stable running of the system 10.

Table 1 sets parameters of status lights of the NVMe SSD of the system 10. The setting parameters of status lights of the NVMe SSD may be the values shown in Table 1, preventing a software conflict between PCIe and the VMD management system, in a situation where the VMD is disabled. Thus, the system 10 may execute monitoring and managing status of SSD through the PCIe software when the VMD is disabled.

TABLE 1 parameters set for status lights of the NVMe SSD

| status of device | indicator control bit | power indicating control bit | status of LED |
|---|---|---|---|
| no malfunction, positioning, or reestablishment | 11 b | 11 b or 01 b | off |
| positioning | 11 b | 10 b | 4 Hz stroboscopic |
| malfunction | 01 b | 11 b | Normally on |
| reestablishment | 01 b | 01 b | 1 Hz stroboscopic |

Figure 2:
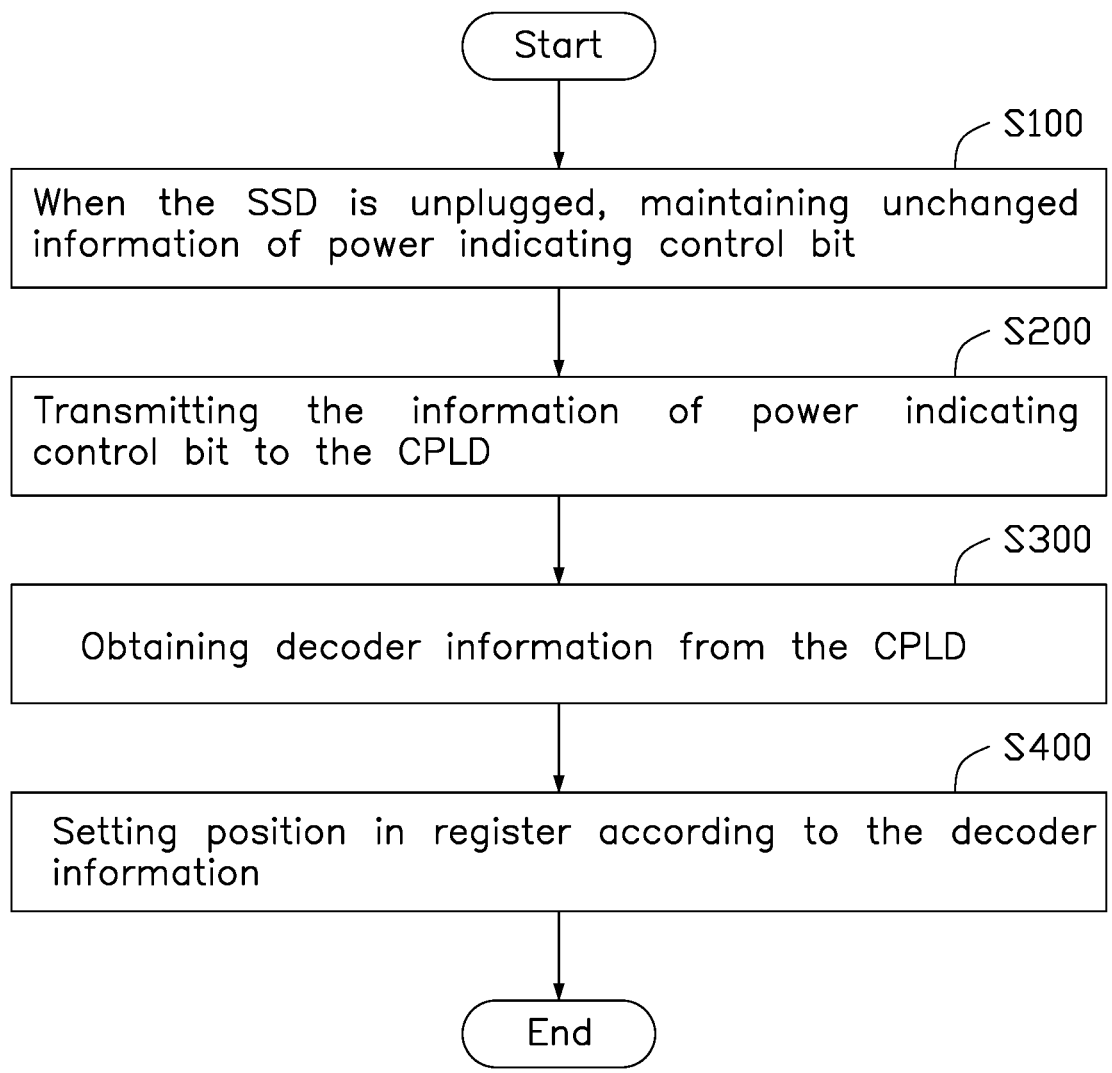
FIG. 2 illustrates a flowchart of an embodiment of a method for monitoring status of SSD.

FIG. 2 illustrates a flowchart of at least one embodiment of a method for monitoring status of SSD. The method for monitoring status of SSD is applied in the system 10 as shown in FIG. 1. The functions may be integrated in the system 10 for the method for monitoring status of SSD. In another embodiment, the method for monitoring status of SSD can be run in a form of software development kit in the computer apparatus.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S100.

At block S100, when the SSD is unplugged, maintaining unchanged information of power indicating control bit.

In at least one embodiment, the maintaining module 110 in such situation maintains unchanged information of power indicating control bit, refer to FIG. 1 for detail description.

At block S200, transmitting the information of power indicating control bit to the CPLD.

In at least one embodiment, the transmitting module 120 transmits the information of power indicating control bit to the CPLD, refer to FIG. 1 for detail description.

At block S300, obtaining decoder information from the CPLD.

In at least one embodiment, the information obtaining module 130 obtains decoder information from the CPLD, refer to FIG. 1 for detail description.

At block S400, setting position in register according to the decoder information.

In at least one embodiment, the setting module 140 sets register position according to the decoder information, refer to FIG. 1 for detail description.

Figure 3:
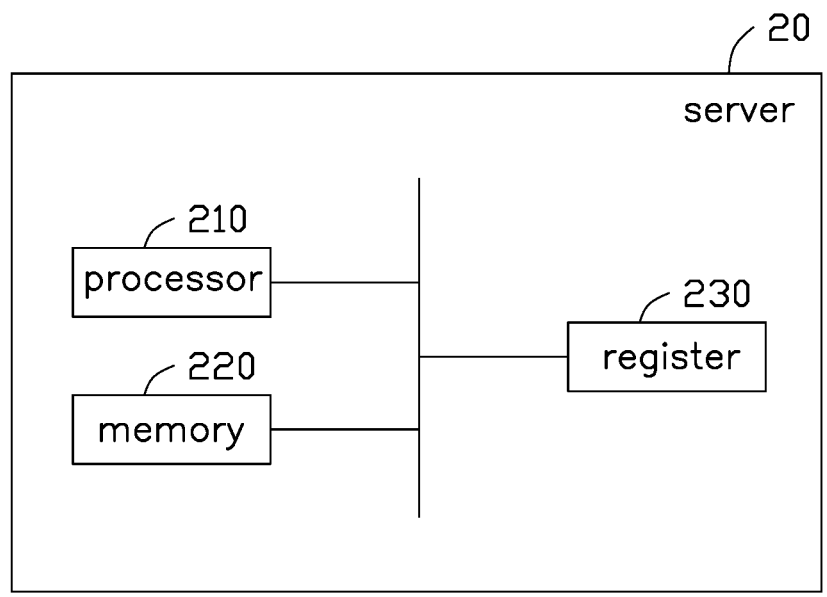
FIG. 3 is a schematic view of an embodiment of a server with SSDs.

FIG. 3 is a schematic view of an embodiment of a server 20. The server 20 includes at least a processor 210 and a memory 220. The processor 210, the memory 220, and a register 230 are interconnected. The processor 210 and the memory 220 may exchange information as to positions in the register 230.

In at least one embodiment, the processor 210 can be formed by integrated circuits, such as an individual integrated circuit or multiple integrated circuits with a same function or different functions. The processor 210 includes, but is not limited to, a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The processor 210 may be a control unit and electrically connected to other elements of the server system 1 through interfaces or a bus. In at least one embodiment, the various types of non-transitory computer-readable storage mediums stored in the memory 220 can be processed by the processor 210 to perform various functions, such as the method for monitoring status of SSD.

In at least one embodiment, the processor 210 may further include one or more interfaces or connectors, which can be but are not limited to, Inter-Integrated Circuit (I2C) interface, Inter-Integrated Circuit Sound (I2S) interface, Pulse Code Modulation (PCM) interface, Universal Asynchronous Receiver/Transmitter (UART) interface, Mobile Industry Processor Interface (MIPI), General-Purpose Input/Output (GPIO) interface, Subscriber Identity Module (SIM) interface, Universal Serial Bus (USB), etc.

In at least one embodiment, the memory 220 can include various types of non-transitory computer-readable storage mediums. The memory 220 can rapidly and automatically access instructions and data when the server system 1 is running. The memory 220 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), and a Compact Disc Read-Only Memory (CD-ROM) for the permanent storage of information. The memory 220 can also be an external storage system, such as a hard disk, a storage card, or a data storage medium.

No hardware needs to be changed or added for the method, system, and server for monitoring status of SSD provided by the present disclosure. After the processor 210 disables the VMD, monitoring and managing status of the SSD is executed through software settings of PCIe.

A non-transitory computer-readable storage medium including program instructions for causing the computer apparatus to perform the method for monitoring status of SSD is also disclosed.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for monitoring status of solid state drive (SSD) applied in a processor with disabled volume management device, the method comprising:
   when the SSD is unplugged, maintaining unchanged information of power indicating control bit through a peripheral component interconnect express (PCIe) software;
   transmitting the information of power indicating control bit to a Complex Programmable Logic Device (CPLD);
   obtaining decoder information from the CPLD; and
   setting position in register according to the decoder information, setting the volume management device as disable, and switching off a positioning LED through the PCIe software.

2. The method according to claim 1, wherein the information of power indicating control bit is set as 01 b.

3. The method according to claim 1, wherein the information of power indicating control bit is set as 1 b.

4. The method according to claim 1, wherein the register position information is set as 1.

5. The method according to claim 1, wherein the transmitting the information of power indicating control bit to the CPLD comprises:
   the processor transmitting the information of power indicating control bit to the CPLD through Inter-Integrated Circuit (I2C).

6. A system for monitoring status of SSD applied in a processor with disabled volume management device, the system comprising:
   a maintaining module configured to, when the SSD is unplugged, maintain unchanged information of power indicating control bit through a peripheral component interconnect express (PCIe) software;
   a transmitting module configured to transmitting the information of power indicating control bit to a CPLD;
   an information obtaining module configured to obtain decoder information from the CPLD; and
   a setting module configured to set position in register according to the decoder information, set the volume management device as disable, and switch off a positioning LED through the PCIe software.

7. The system according to claim 6, wherein the information of power indicating control bit is set as 01 b.

8. The system according to claim 6, wherein the information of power indicating control bit is set as 1 b.

9. The system according to claim 6, wherein the register position information is set as 1.

10. The system according to claim 6, wherein the transmitting module transmits the information of power indicating control bit to the CPLD comprises:
    the processor transmits the information of power indicating control bit to the CPLD through I2C.

11. A server for monitoring status of SSD applied in a processor with disabled volume management device, the server comprising:
    at least one processor; and
    at least one memory coupled to the at least one processor and storing program instructions; the at least one memory and the program instructions configured to, with the at least one processor, cause the apparatus to perform:
    when the SSD is unplugged, maintaining unchanged information of power indicating control bit through a peripheral component interconnect express (PCIe) software;
    transmitting the information of power indicating control bit to a CPLD;
    obtaining decoder information from the CPLD; and
    setting position in register according to the decoder information, setting the volume management device as disable, and switching off a positioning LED through the PCIe software.

12. The server according to claim 11, wherein the information of power indicating control bit is set as 01 b or 1 b.

13. The server according to claim 11, wherein the register position information is set as 1.

14. The server according to claim 11, wherein the transmitting the information of power indicating control bit to the CPLD comprises:
    the processor transmits the information of power indicating control bit to the CPLD through I2C.

* * * * *